United States Patent
Buffet et al.

(10) Patent No.: US 6,584,596 B2
(45) Date of Patent: Jun. 24, 2003

(54) METHOD OF DESIGNING A VOLTAGE PARTITIONED SOLDER-BUMP PACKAGE

(75) Inventors: Patrick H. Buffet, Essex Junction, VT (US); Charles S. Chiu, Essex Junction, VT (US); Yu H. Sun, Williston, VT (US)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 09/682,584

(22) Filed: Sep. 24, 2001

(65) Prior Publication Data

US 2003/0061571 A1 Mar. 27, 2003

(51) Int. Cl.$^7$ .................... G06F 17/50; G06F 17/10
(52) U.S. Cl. .................. 716/1; 716/4; 716/10; 703/2
(58) Field of Search ................. 716/1, 2, 4, 5, 716/7, 8, 9, 10, 11, 12, 13, 14, 15; 703/2, 13, 14

(56) References Cited

U.S. PATENT DOCUMENTS

| | | | |
|---|---|---|---|
| 4,503,386 A | | 3/1985 | DasGupta et al. |
| 4,890,238 A | | 12/1989 | Klein et al. |
| 5,081,602 A | * | 1/1992 | Glover ................. 703/13 |
| 5,160,997 A | | 11/1992 | Sandoh et al. |
| 5,216,278 A | | 6/1993 | Lin et al. |
| 5,243,547 A | * | 9/1993 | Tsai et al. ............. 703/14 |
| 5,694,344 A | * | 12/1997 | Yip et al. ............. 703/2 |
| 5,838,021 A | | 11/1998 | Ancona |
| 5,943,486 A | | 8/1999 | Fukui et al. |
| 5,977,606 A | | 11/1999 | Sakurai et al. |
| 6,025,616 A | | 2/2000 | Nguyen et al. |

FOREIGN PATENT DOCUMENTS

| | | |
|---|---|---|
| JP | 9321142 | 12/1997 |
| JP | 10124560 | 5/1998 |

OTHER PUBLICATIONS

Buffet et al., "Methodology for I/O Cell Placement and Checking in ASIC Designs Using Area–Array Power Grid," IEEE 2000 Custom Ics Conference, pp. 125–128.*

* cited by examiner

Primary Examiner—Leigh M. Garbowski
(74) Attorney, Agent, or Firm—Schmeiser Olsen & Watts; Richard M. Kotulak (57) ABSTRACT

Disclosed is a method of designing voltage partitions in a solder bump package for a chip, comprising: determining the current requirements of a chip voltage island, the chip voltage island including chip power and signal pads, and creating an equivalent circuit model of the chip voltage island; defining a package voltage island, the package voltage island including power and signal package pins, and creating an equivalent circuit model of the package voltage island; analyzing electrical attributes of a combination of the chip voltage island model and the package voltage island model; and modifying the package voltage island until the electrical attributes are acceptable.

36 Claims, 10 Drawing Sheets

| CHIP PAD (SOLDER BUMP) | PACKAGE PIN | FUNCTION |
|---|---|---|
| P1 | A1 | GND |
| P2 | A2 | VDD |
| P3 | A3 | VDDX |
| P4 | B1 | SIGNAL 1 |
| P5 | B2 | GND |
| P6 | B3 | VDD |
| P7 | C1 | VDDX |
| P8 | C2 | SIGNAL 2 |
| P9 | C3 | GND |
| ○○○ | ○○○ | ○○○ |

METHOD OF DESIGNING A VOLTAGE PARTITIONED SOLDER-BUMP PACKAGE

BACKGROUND OF THE INVENTION

Field of the Invention

The present invention relates to the field of integrated circuit design; more specifically, it relates to a method for designing a voltage partitioned solder-bump package.

In an effort to increase performance, lower power consumption and integrate several integrated circuit technologies on the same chip, the concept of voltage islands has been introduced into integrated circuit design.

The voltage island concept allows for one or more regions of an integrated chip (islands) to be powered by both a chip wide power source (VDD) and one or more additional, voltage island power sources (VDDX.) VDDX and VDD can be switched on and off by the user as the operation of the integrated circuit demands. However, integrated circuit chips are generally mounted to a next higher level of packaging. One widely used class of packages is solder-bump packages. Solder bump packages derive their name from the fact that integrated circuit chips are attached to pads on the package with solder bumps. Solder bump connections are also known as C4 (controlled collapse chip connections.)

A solder bump package for an integrated circuit chip having a voltage island (a voltage partitioned solder-bump package) must be compatible with and capable of supporting the power distribution and noise requirements of the voltage island, while not violating the geometric constraints of the solder-bump package technology. Such restraints include, for example, placement of package voltage island power planes to be under the solder bumps to provide low inductance, thus restricting which and how many package pins may be assigned to a particular voltage island. Additionally, the presence of power and signal planes in the package substrate must be accounted for.

Present design methodology for voltage partitioned solder-bump packages relies heavily on user intervention and trial and error approaches that are both costly and time consuming. An automated design methodology for voltage partitioned solder-bump packages would greatly speed up the solder-bump package design process and reduce costs.

SUMMARY OF THE INVENTION

A first aspect of the present invention is a method of designing voltage partitions in a solder bump package for a chip, comprising: determining the current requirements of a chip voltage island, the chip voltage island including chip power and signal pads, and creating an equivalent circuit model of the chip voltage island; defining a package voltage island, the package voltage island including power and signal package pins, and creating an equivalent circuit model of the package voltage island; analyzing electrical attributes of a combination of the chip voltage island model and the package voltage island model; and modifying the package voltage island until the electrical attributes are acceptable.

A second aspect of the present invention is a computer system comprising a processor, an address/data bus coupled to the processor, and a computer-readable memory unit coupled to communicate with the processor, the memory unit containing instructions that when executed implement a method for designing voltage partitions in a package for a chip, the method comprising the computer implemented steps of: determining the current requirements of a chip voltage island, the chip voltage island including chip power and signal pads, and creating an equivalent circuit model of the chip voltage island; defining a package voltage island, the package voltage island including power and signal package pins, and creating an equivalent circuit model of the package voltage island; analyzing electrical attributes of a combination of the chip voltage island model and the package voltage island model; and modifying the package voltage island until the electrical attributes are acceptable.

A third aspect of the present invention is a program storage device readable by machine, tangibly embodying a program of instructions executable by the machine to perform method steps for designing voltage partitions in a package for a chip the method steps comprising: determining the current requirements of a chip voltage island, the chip voltage island including chip power and signal pads, and creating an equivalent circuit model of the chip voltage island; defining a package voltage island, the package voltage island including power and signal package pins, and creating an equivalent circuit model of the package voltage island; analyzing electrical attributes of a combination of the chip voltage island model and the package voltage island model; and modifying the package voltage island until the electrical attributes are acceptable.

BRIEF DESCRIPTION OF THE DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION OF THE INVENTION

Figure 1:
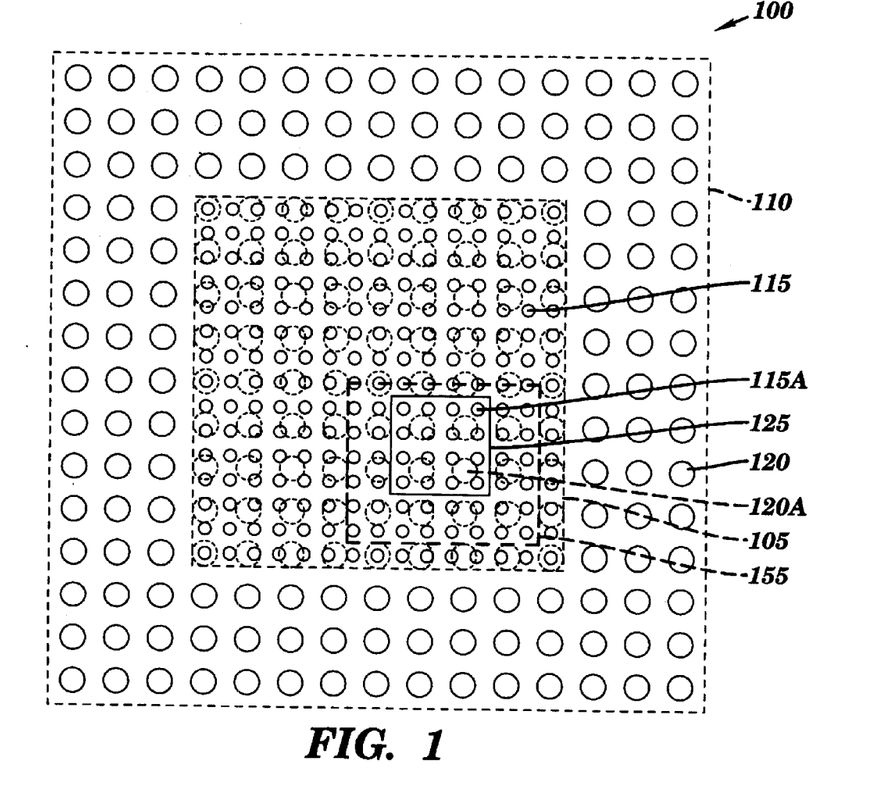
FIG. 1 is a top view of a voltage partitioned solder-bump package according to the present invention.

FIG. 1 is a top view of a voltage partitioned solder-bump package according to the present invention. Integrated circuit device 100 includes an integrated circuit chip 105 mounted to a solder-bump package 110. Integrated circuit chip 105 includes a multiplicity of chip pads 115 arranged in a matrix. Solder bump package 110 contains a multiplicity of pins 120 arranged in a matrix. Pins 120 are used to supply power and signals to integrated circuit chip 105. Within integrated chip 105 is a chip voltage island(s) 125. Chip voltage island 125 is powered by both VDD and one or more additional power sources VDDX. Chip voltage island 125 is connected to a multiplicity of chip voltage island pads 115A. Chip voltage island pads 115A are a subset of chip pads 115 that are physically located in the outline of the chip voltage island. The outline of a package voltage island 155, at least a portion of which extends under chip voltage island 125, is also illustrated in FIG. 1.

Figure 2:
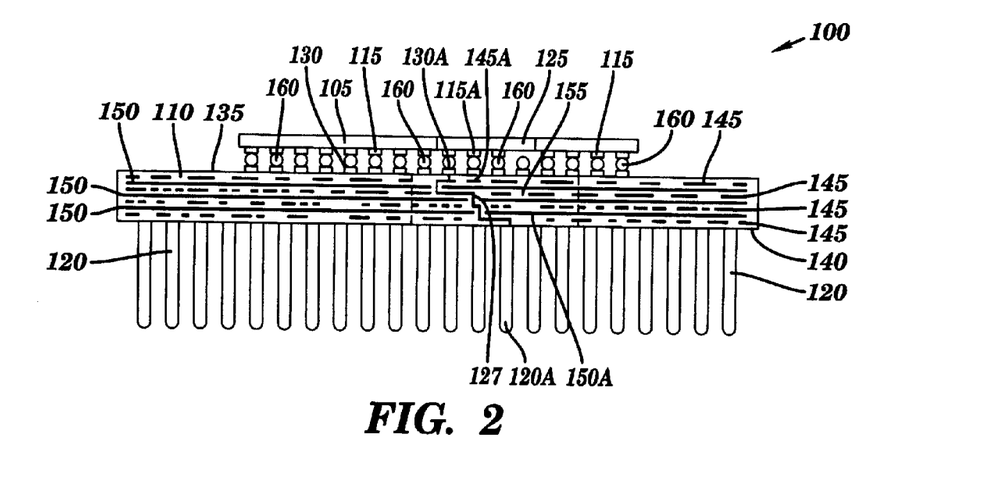
FIG. 2 is a sectional side view of the voltage partitioned solder-bump package illustrated in FIG. 1, according to the present invention.

FIG. 2 is a sectional side view of the voltage partitioned solder-bump package illustrated in FIG. 1, according to the present invention. In FIG. 2, solder-bump package 110 includes a multiplicity of package pads 130 arranged in a matrix on a top surface 135 of the package. Pins 120 are arranged in a matrix and protrude from a bottom surface 140 of solder-bump package 110. Solder-bump package 110 contains a multiplicity of signal planes 145 that carry I/O signals between package pads 130 and pins 120. Solder-bump package 110 also contains a multiplicity of power planes 150 that carry VDD, VDDX and GND between package pads 130 and pins 120. At least a portion of package voltage island 155 extends under and is approximately aligned to chip voltage island 125. Package voltage island 155 is a region of solder-bump package 110 containing package voltage island pins 120A (which are a subset of pins 130), package voltage island pads 130A (which are a subset of package pads 130) and wherein package voltage island signal planes 145A and package voltage island power planes 150A are dedicated to carry signals and VDD/VDDX/GND respectively only to chip voltage island 125. It is possible to have non-voltage island pins within the outline of package voltage island 155.

Pins 120 are connected to package pads 130 by channels. For example, one package voltage island pin 120A is electrically connected to one package voltage island pad 130A by a channel 127. Only one channel is illustrated in FIG. 2, but generally, there is one channel for each package pin 120 and corresponding package pad 130. Package pads 130 are electrically connected to chip pads 115 by solder bumps 160. In the present example, each signal path includes a pin, a package channel, a package pad, a solder bump and a chip pad. Vertical signal and power connections are made by vias (not illustrated) extending between signal and power planes through openings in power planes 145.

The solder bump package illustrated in FIG. 2 is a pin grid array (PGA) package. The present invention may be applied to other package types. Examples of other package types include, but are not limited to, ball grid array (BGA) packages and column grid array (CGA) packages. Obviously, solder-bump package 110 is also a multi-layer package, examples of which include multi-layer ceramic (MLC) packages.

Figure 3:
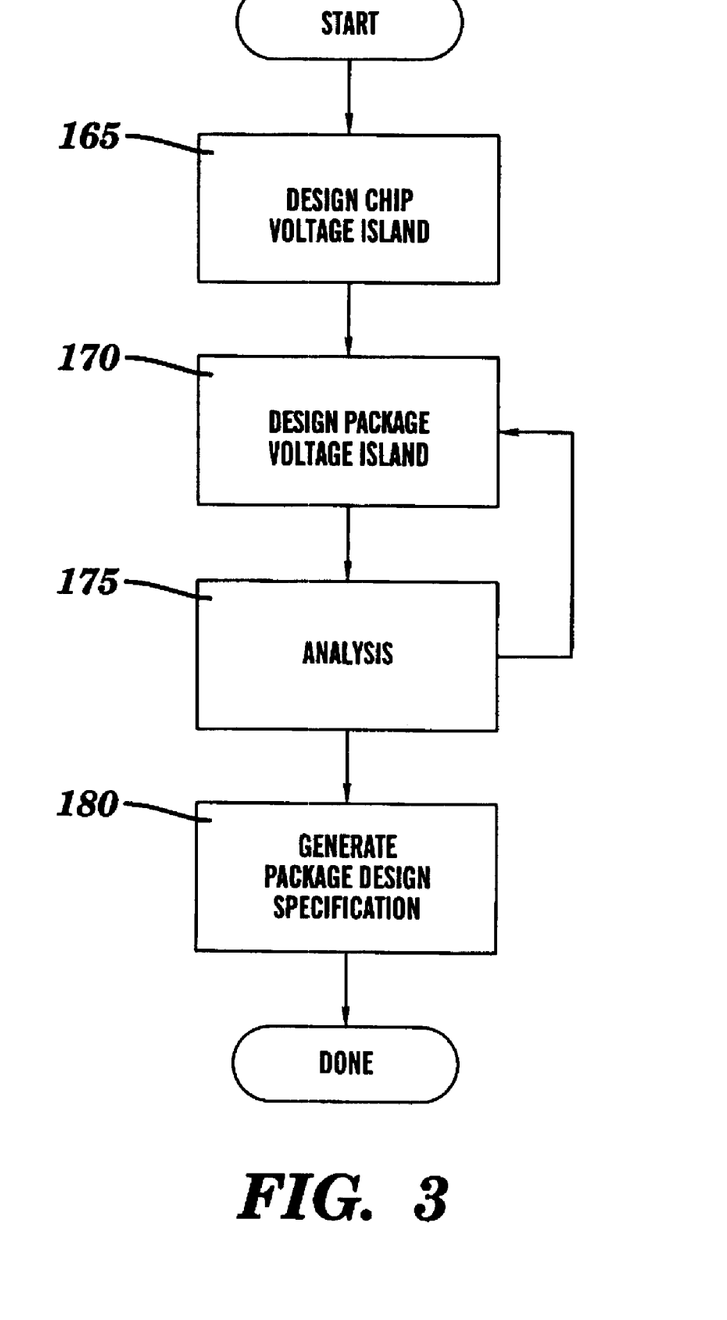
FIG. 3 is a flow diagram describing the method of designing a voltage partitioned solder-bump package according to the present invention.

FIG. 3 is a flow diagram describing the method of designing a voltage partitioned solder-bump package according to the present invention. In step 165, chip voltage island 125 is designed. The method of designing chip voltage island 125 includes determining the current related parameters of the voltage island, the area of the voltage island, assigning chip voltage island pads 115A to the chip voltage island and creating a model of the chip voltage island. Step 165 is illustrated in FIG. 4, and described in more detail below.

Figure 8:
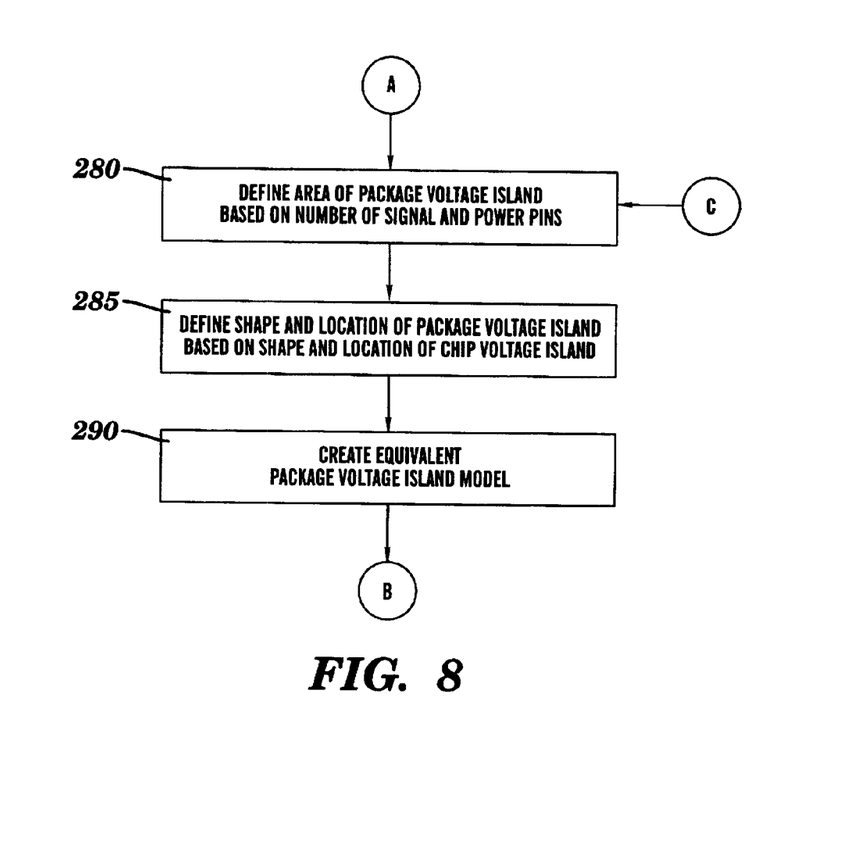
FIG. 8 is a flow diagram describing in detail step 170 of the flowchart illustrated in FIG. 3, according to the present invention.

In step 170, package voltage island 155 is designed. The method of designing package voltage island 155 includes defining the area of the region of solder-bump package 110 assigned to the package voltage island, defining the shape of the package voltage island and creating a package voltage island inductance model. Step 170 is illustrated in FIG. 8, and described in more detail below.

Figure 11:
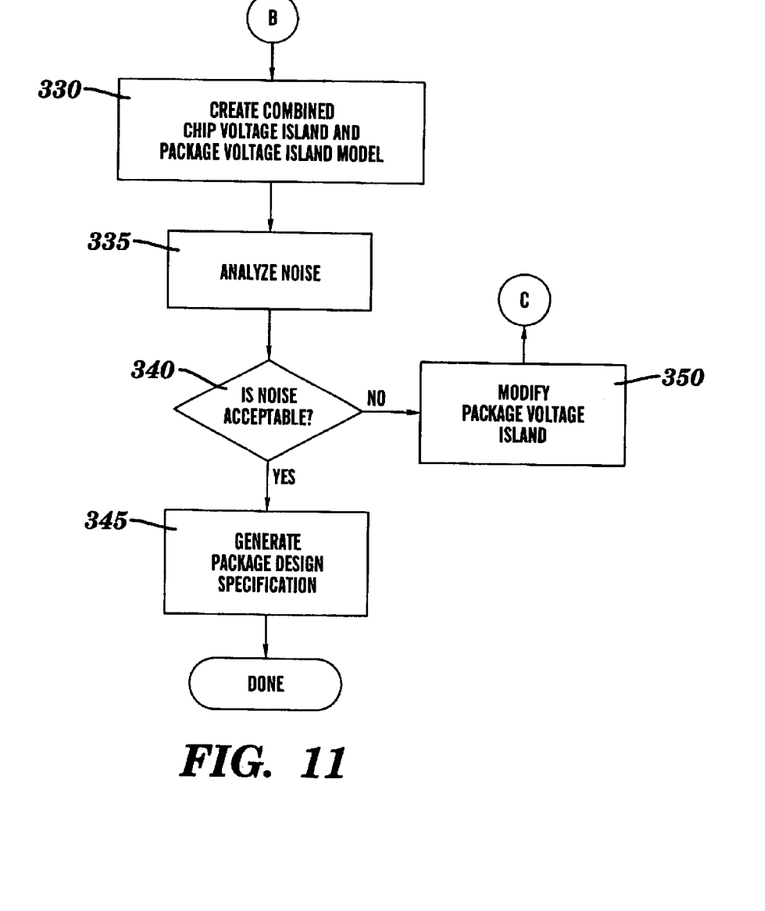
FIG. 11 is a flow diagram describing in detail steps 175 and 180 of the flowchart illustrated in FIG. 3, according to the present invention.

In step 175, the chip voltage island model is combined with the package voltage island inductance model, a noise analysis (analysis of other electrical attributes such as power supply impedance analysis, power supply resonance analysis, signal integrity analysis and signal jitter analysis may also be done) is performed and corrective changes to the design of package voltage island 155 are made if necessary. Step 175 is illustrated in FIG. 11, and described in more detail below.

Figure 4:
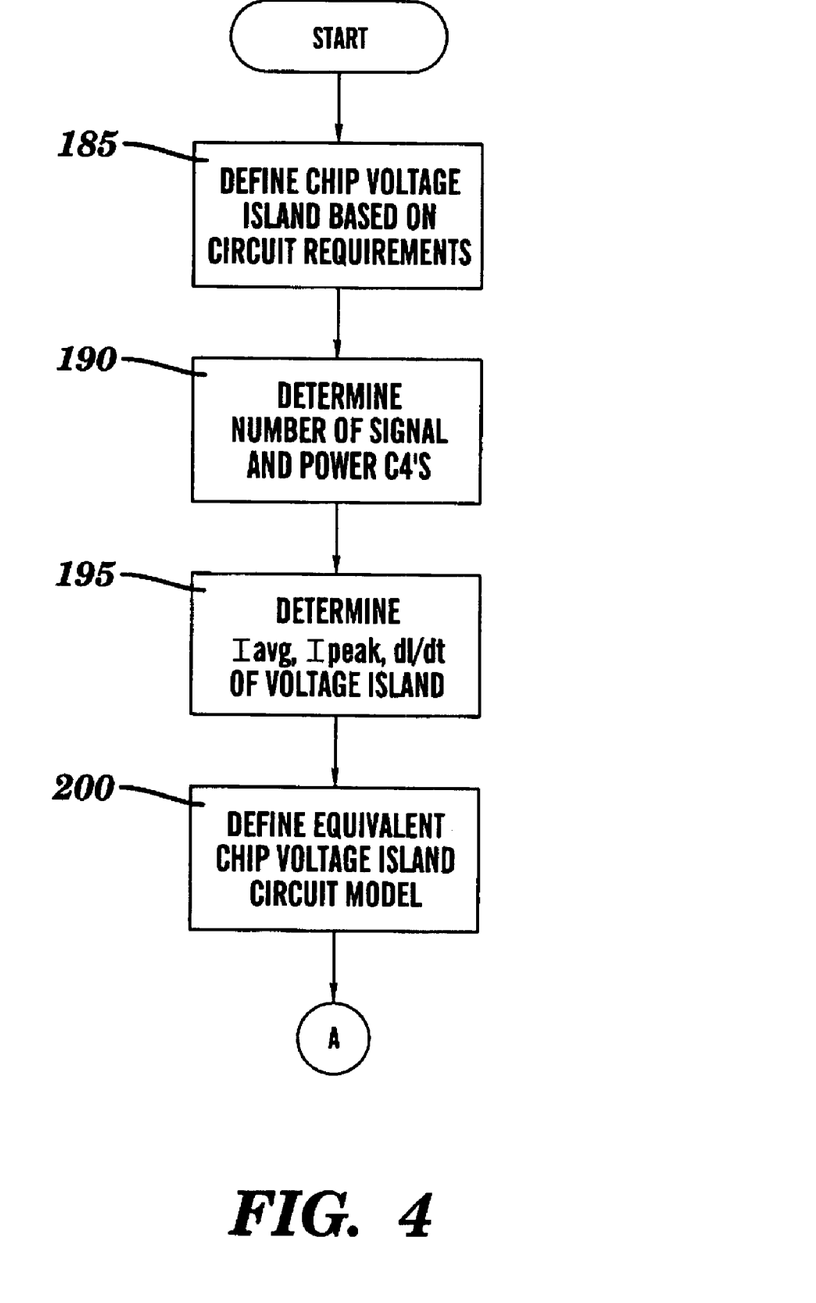
FIG. 4 is a flow diagram describing in detail step 165 of the flowchart illustrated in FIG. 3, according to the present invention.
Figure 5A:
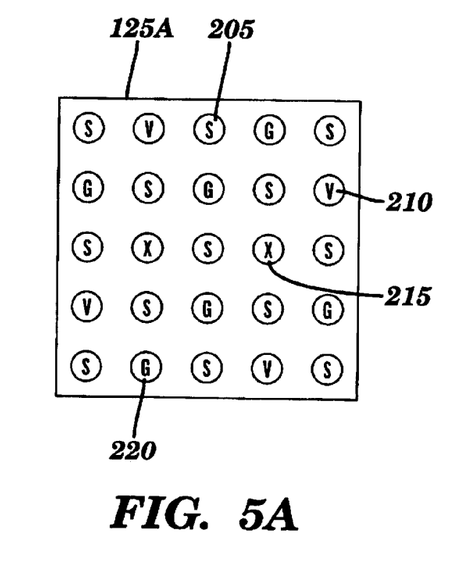
FIGS. 5A and 5B are diagrams illustrating exemplary layouts of a chip voltage island according to the present invention.
Figure 5B:
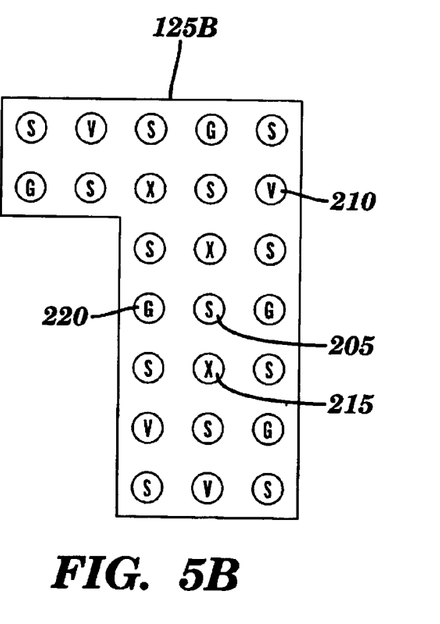
Figure 6:
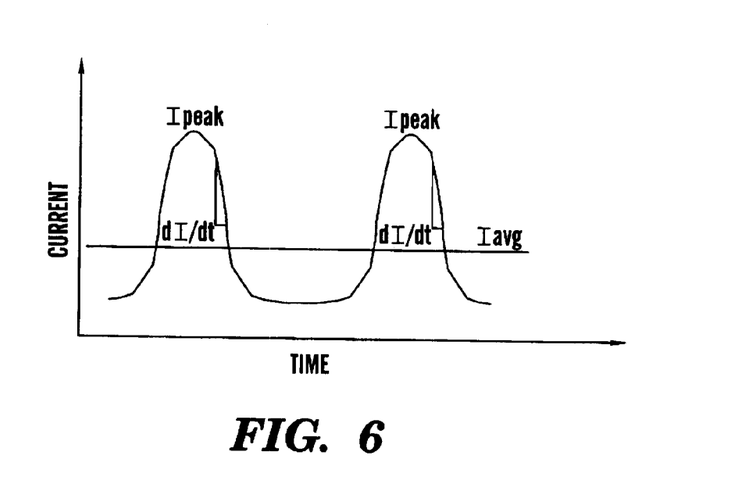
FIG. 6 is a plot of current vs. time illustrating current flow in a voltage island according to the present invention.

FIG. 4 is a flow diagram describing in detail step 165 of the flowchart illustrated in FIG. 3, according to the present invention. In step 185, chip voltage island 125 is defined based on circuit requirements. The voltage supply and power bus distribution of voltage island 125 is separated from the non-voltage island region of chip 105. The area of chip voltage island 125 is also defined. In step 190, the number of chip voltage island pads 115A and their assignments for VDD, VDDX, GND and I/O signals are made. Layout of voltage island 125 is also determined. FIGS. 5A and 5B illustrate two example voltage island layouts and pad assignments. In step 195, based on the circuit requirements for voltage island 125 the average current (Iavg), the peak current (Ipeak) and current slew rate (dI/dt) can be determined from either the specification of the voltage island or from a circuit model of the voltage island. A typical plot of current vs. time for a voltage island is illustrated in FIG. 6 and described below.

Figure 7:
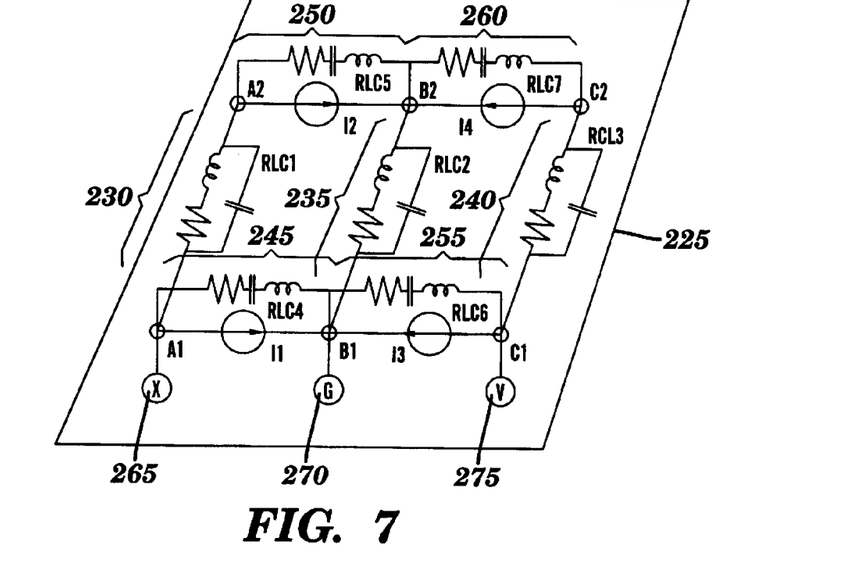
FIG. 7 is a diagram of an equivalent circuit model of a chip voltage island according to the present invention.

Next, in step 200, a chip voltage island model is created. The current requirements determined in step 195 are used as input data to the chip voltage island model. A diagram of a chip voltage island model is illustrated in FIG. 7 and described below.

In one example, the chip voltage island model is created from design specifications and inputted to a SPICE (simulation program for integrated circuits emphasis) based software package. SPICE is a circuit simulator that was originally developed at the Electronics Research Laboratory of the University of California, Berkeley (1975) and many well-known commercial software packages are available. In a SPICE simulator, the user inputs circuit models in a spice netlist format. The simulator may calculate and plot nodal voltages and currents in both time and frequency domains.

FIGS. 5A and 5B are diagrams illustrating exemplary layouts of a chip voltage island according to the present invention. In FIG. 5A, a voltage island 125A is designed as a rectangle and chip pads have been assigned as signal I/O pads 205, VDD pads 210, VDDX pads 215 and GND pads 220. In FIG. 5B, a voltage island 125B is designed in an irregular shape and chip pads have been assigned as signal I/O pads 205, VDD pads 210, VDDX pads 215 and GND pads 220.

FIG. 6 is a plot of current vs. time illustrating current flow in a voltage island according to the present invention. In FIG. 6, IPEAK is the maximum current voltage island 125 draws.

Generally, voltage island 125 is drawing IPEAK for only a short time, but the power buses must be able to supply IPEAK without exceeding IR and L dI/dt drop limits. IAVG is the time averaged current voltage island 125 is drawing. dI/dt is the rate of rise or fall of current in voltage island 125. The power buses must be able to supply quick rises and falls in current without exceeding IR and L dI/dt drop limits.

FIG. 7 is a diagram of an equivalent circuit model of a chip voltage island according to the present invention. In FIG. 7, a chip power bus 225 is modeled as a VDDX bus 230 between nodes "A1" and "A2" having a series resistance and inductance and parallel capacitance RLC1, a GND bus 235 between nodes "B1" and "B2" having a series resistance and inductance and parallel capacitance RLC2 and a VDD bus 240 between nodes "C1" and "C2" having a series resistance and inductance and parallel capacitance RLC3. For a simple model, at low frequency, only resistance need be modeled. At edge rate knee frequencies approaching 1 GHz, resistance, capacitance and inductance should be modeled for accuracy. At 10 GHz and higher, resistance, capacitance and inductance almost certainly should be modeled.

The load on power bus 225 is modeled as a first load 245 across nodes "A1" and "B1," a second load 250 across nodes "A2" and "B2," a third load 255 across nodes "C1" and "B1" and a fourth load 260 across nodes "C2" and "B2." First load 245 is modeled as a current source 11 and a resistance, capacitance and inductance RLC4. Second load 250 is modeled as a current source 12 and a resistance, capacitance and inductance RLC5. Third load 255 is modeled as a current source 13 and a resistance, capacitance and inductance RLC6. Fourth load 260 is modeled as a current source 14 and a resistance, capacitance and inductance RLC7. First and second loads 245 and 250 are powered by VDDX while third and fourth loads 255 and 260 are powered by VDD. While four loads are illustrated in FIG. 7, generally there is a multiplicity of loads VDDX is supplied to VDDX bus 230 from a VDDX chip pad 265. GND is supplied to GND bus 235 from a GND chip pad 270. VDD is supplied to VDD bus 240 from a VDD chip pad 275. There may be multiple VDDX, VDD and GND chip pads.

While only one VDDX, VDD and GND chip pads are illustrated in FIG.7, generally there is a multiplicity of VDDX, VDD and GND pads for each voltage island. FIG. 7 is an example of how the circuits and package may be modeled. The actual model used will depend upon the chip power bus design and types of circuits utilized.

Voltage drops are calculated at nodes A1 and A2, B1 and B2 and C1 and C2.

FIG. 8 is a flow diagram describing in detail step 170 of the flowchart illustrated in FIG. 3, according to the present invention. In step 280, package voltage island 155 is defined. Package voltage island 155 is defined in the first pass based on the number of signal I/O's required and the VDD, VDDX current requirements of chip voltage island 125.

In step 285, package voltage island 155 is designed. Because of the need to reduce package inductance, package voltage island is placed at least partially under and may extend outward of the outline of chip voltage island 125. Generally package voltage island is one contiguous region that mimics the geometry of chip voltage island 125 with a one to one mapping of chip signal I/O pads to package signal I/O pins, but not necessarily a one to one mapping of VDD, VDDX and GND voltage island chip pads to package voltage island VDD, VDDX and GND pins. An example of mapping a chip voltage island to a package voltage island is illustrated in FIG. 9 and described below.

Figure 10:
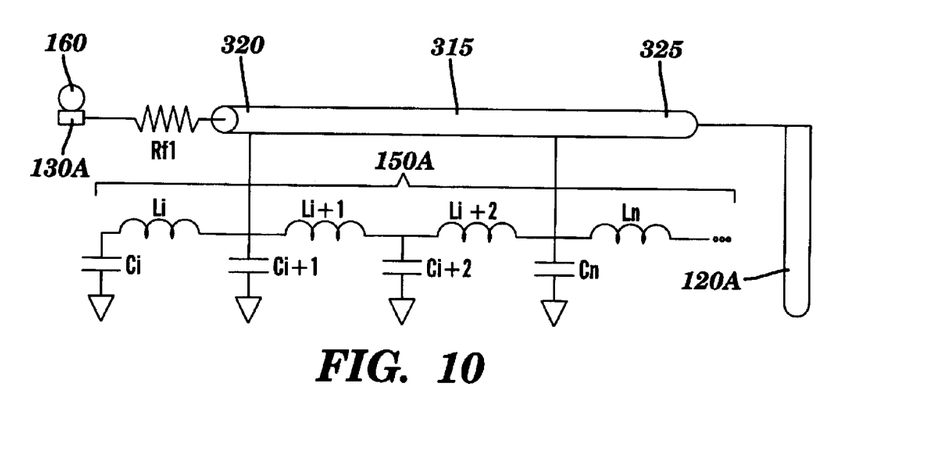
FIG. 10 is an equivalent circuit model diagram of a package voltage island channel according to the present invention.

In step 290, a package voltage island inductance model is created using an electromagnetic field solver. An electromagnetic field solver is a software tool that reads in the geometry (length and cross-section) of conductor structures, and given the dielectric constant of the medium, generates the electrical equivalent R (resistor), C (capacitor) and L (inductor) circuit representation at the circuit operating frequency. An example of an electro-magnetic field solver software tool is HFSS. by the Ansoft Corporation (Pittsburgh, PA.) An example of an a package voltage island inductance model is illustrated in FIG. 10 and described below.

Figure 9:
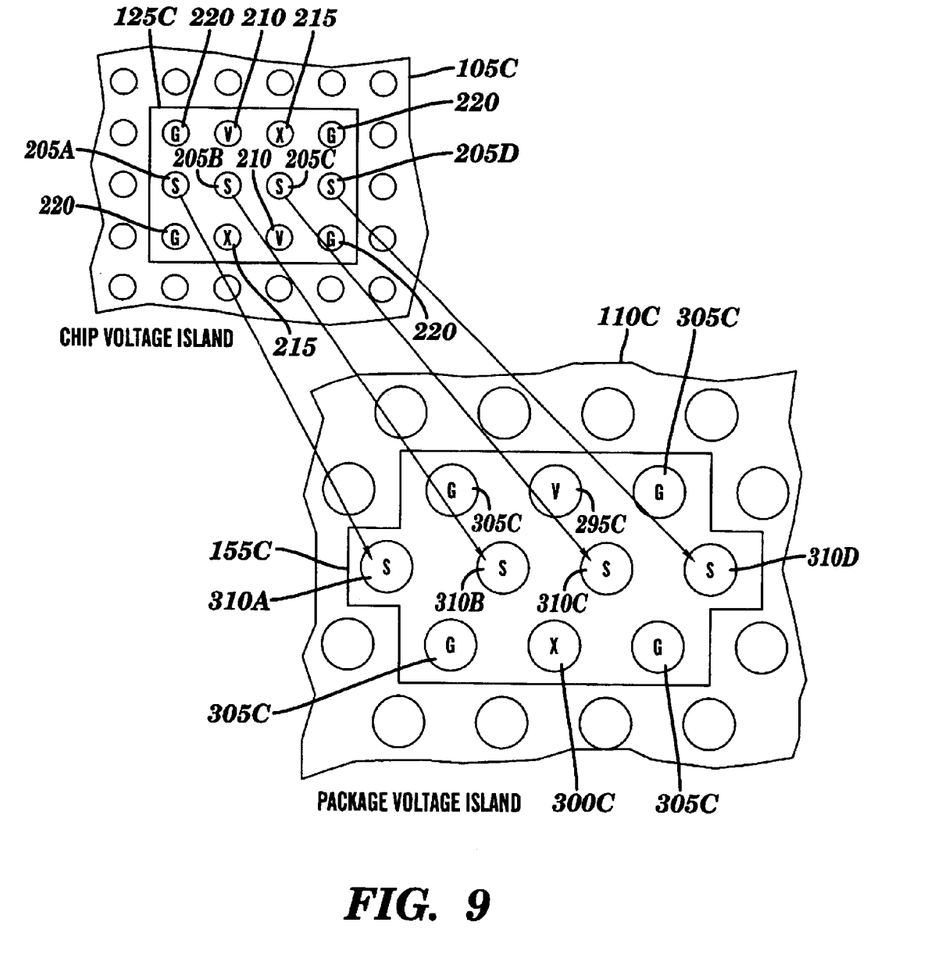
FIG. 9 an exemplary diagram illustrating initial definition of the layout of a package voltage island according to the present invention.

FIG. 9 is a exemplary diagram illustrating initial definition of the layout of a package voltage island according to the present invention. In FIG. 9 a chip voltage island 125C on an integrated circuit chip 105C includes two VDD pads 210, two VDDX pads 215, four GND pads 220 and four signal I/O pads 205A through 205D. A package voltage island 155C on an solder-bump package 110C includes one VDD pin 295C, one VDDX pin 300C, four GND pins 305C and four signal I/O pins 310A through 310D.

In the completed package design, package voltage island signal I/O pads corresponding to chip voltage island signal I/O pads are wired through channels in the solder-bump package so, after reflow of the solder bumps (also called C4 solder balls), signal I/O pad 205A is electrically connected to signal I/O pin 310A, signal I/O pad 205B is electrically connected to signal I/O pin 310B, signal I/0 pad 205C is electrically connected to signal I/O pin 310C and signal I/O pad 205D is electrically connected to signal I/O pin 310D.

Package voltage island VDD pads corresponding to chip voltage island VDD pads are wired through power planes in the solder-bump package so, after reflow of the solder bumps VDD pads 210 are electrically connected to VDD pin 295C.

Package voltage island VDDX pads corresponding to chip voltage island VDDX pads are wired through power planes in the solder-bump package so, after reflow of the solder bumps VDDX pads 215 are electrically connected to VDDX pin 300C.

Package voltage island GND pads corresponding to chip voltage island GND pads are wired through power planes in the solder-bump package so, after reflow of the solder bumps GND pads 220 are electrically connected to GND pins 305C.

While signal I/Os are mapped one for one, VDD, VDDX and GND do not need to be mapped one for one. Additionally, while voltage island I/O signal wiring and pins as well as voltage island VDD wiring and pins and voltage island VDDX wiring and pins must remain within the package voltage island outline.

FIG. 10 is an equivalent circuit model diagram of a package voltage island according to the present invention. In FIG. 10, a wiring channel 315 has a first end 320 coupled to a package voltage island pad 130A and a second end 325 coupled to a package voltage island pin 120A. A frequency dependent resistor Rf1 is modeled between package voltage island pad 130A and first end 320. The field solver represents the inductance of channel 315 on package voltage island power planes 150A as a network of inductors LI through LI+N, each inductor coupled to ground through a capacitor CI to CI+N.

Figure 13:
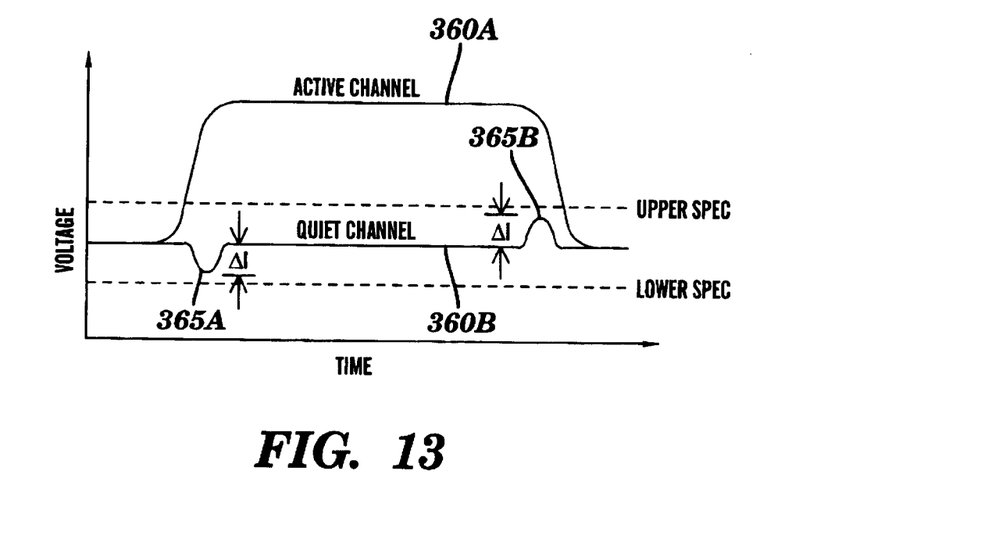
FIG. 13 is a plot of voltage vs. time illustrating noise induced in a quiet channel by an active channel according to the present invention.

FIG. 11 is a flow diagram describing in detail steps 175 and 180 of the flowchart illustrated in FIG. 3, according to the present invention. In step 330, the chip voltage island model is combined with the package voltage island inductance model and inputted to a simulator such as SPICE. In step 335, the combined chip voltage island/package voltage island model is analyzed for noise, again using a simulator such as SPICE. In the present example, the analysis is limited to noise, but other analysis such as power supply impedance analysis, power supply resonance analysis, signal integrity analysis and signal jitter analysis may also be done using similar techniques as used for noise analysis. Noise is a voltage spike (Î"I) induced in a quiet channel by an active channel when the active channel is switching. An example of noise induced in a quiet channel by an active channel is illustrated in FIG. 13 and described below. In step 340, a determination is made if the noise level of the combined chip voltage island/package voltage island model is acceptable (within specification.)

Figure 15:
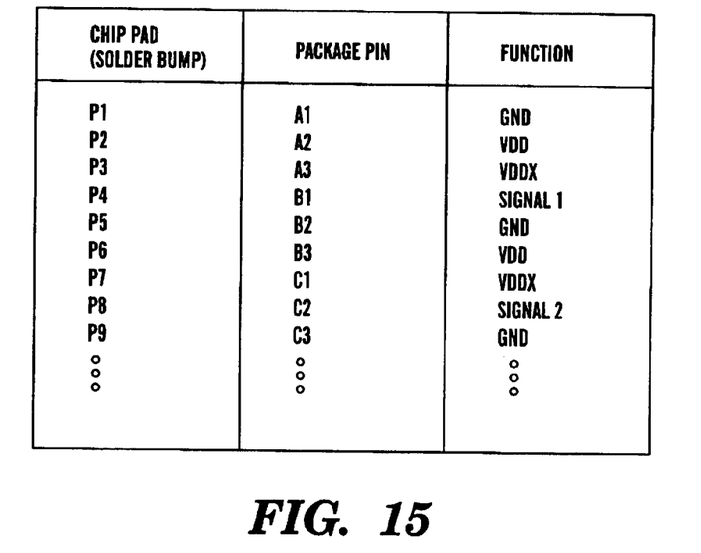
FIG. 15 is a table illustrating a package design specification according to the present invention.

If in step 340, the noise level is acceptable then the method proceeds to step 345. In step 345, a package design specification is generated and the method terminates. A package design specification is illustrated in FIG. 15 and described below.

Figure 14:
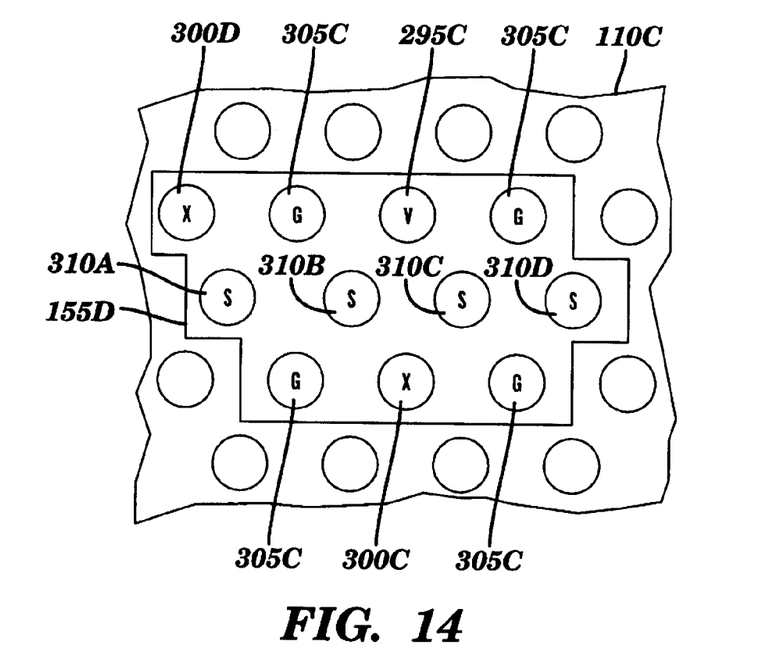
FIG. 14 is partial top view illustrating initial package pins assigned to package voltage island and optionally added package voltage island VDDX pin 300D assigned after noise analysis.

If in step 340, the noise level is not acceptable then the method proceeds to step 350. In step 350, three possible actions may be taken to modify the package voltage island. The first possible action is to add more power pins to the package voltage island. This option is illustrated in FIG. 14 and described below. The second possible action is to increase the area of the package voltage island region of the solder-bump package in order to increase the power pin count. The third possible action is to reassign chip voltage island (also the corresponding package voltage island pads) between VDD, VDDX and GND. After one of the actions is taken the method loops to step 280 of FIG. 8. Assignment of another package voltage island pad to a package voltage island is illustrated in FIG. 14 and described below.

Figure 12:
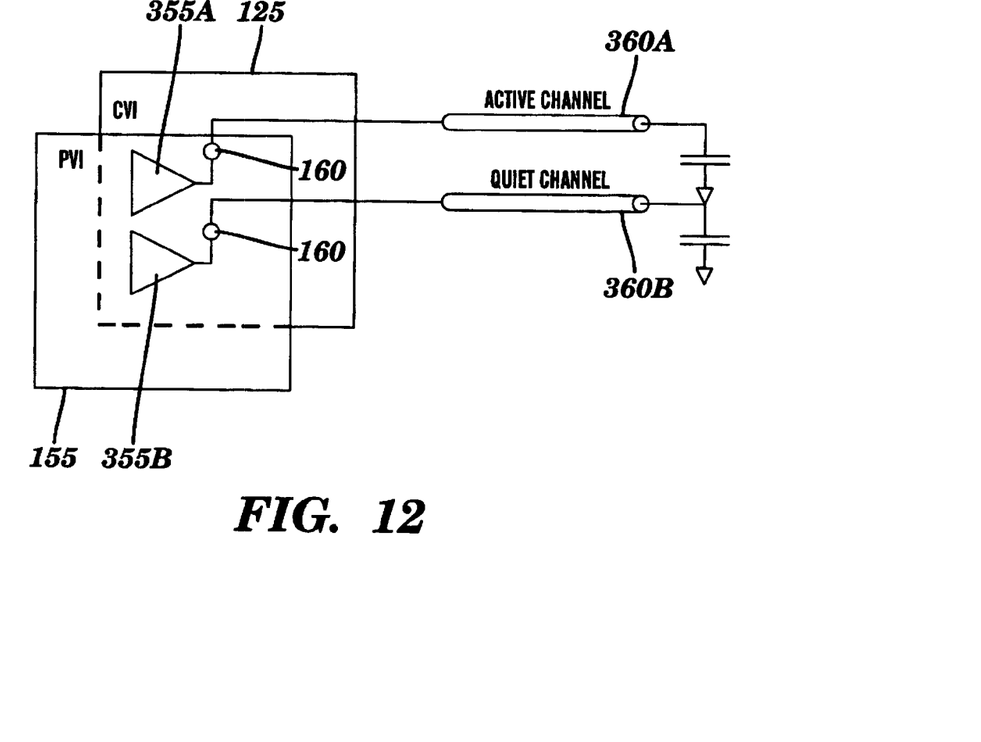
FIG. 12 is a diagram of a noise analysis model of a chip voltage island combined with a package voltage island model according to the present invention.

FIG. 12 is a diagram of a noise analysis model of chip voltage island combined with a package voltage island according to the present invention. In FIG. 12 a first driver 355A on chip voltage island 125 is connected to a first channel 360A on package voltage island 155 through a first solder-bump 160. A second driver 355B on chip voltage island 125 is connected to a second channel 360B on package voltage island 155 through a second solder-bump 160.

First channel 360A is designated active as the model simulates a signal to the first channel. Second channel 360B is designated quiet as the model determines what signal is induced in the second channel in responds to first channel 360A being active.

FIG. 13 is a plot of voltage vs. time illustrating noise induced in a quiet channel by an active channel according to the present invention. In FIG. 13 as active channel 360A switches low to high a negative voltage spike 365A, is induced in quiet channel 360B. A positive voltage spike 365B is induced in quiet channel 360B when active channel 360A switches from high to low.

FIG. 14 is partial top view illustrating initial package pins assigned to package voltage island and optionally added package voltage island VDDX pin 300D assigned after noise analysis. In the example of FIG. 14, package voltage island 155D is identical to package voltage island 155C illustrated in FIG. 9 and described above except for the added package voltage island VDDX pin 300D. In other examples the added pin(s) may be a VDD or a GND pin(s)

FIG. 15 is a table illustrating a package design specification according to the present invention. A package design specification includes at least a list of chip pads IDs (solder bump IDs), a list of the corresponding package pin IDs and a list of corresponding functions for the chip pads.

Figure 16:
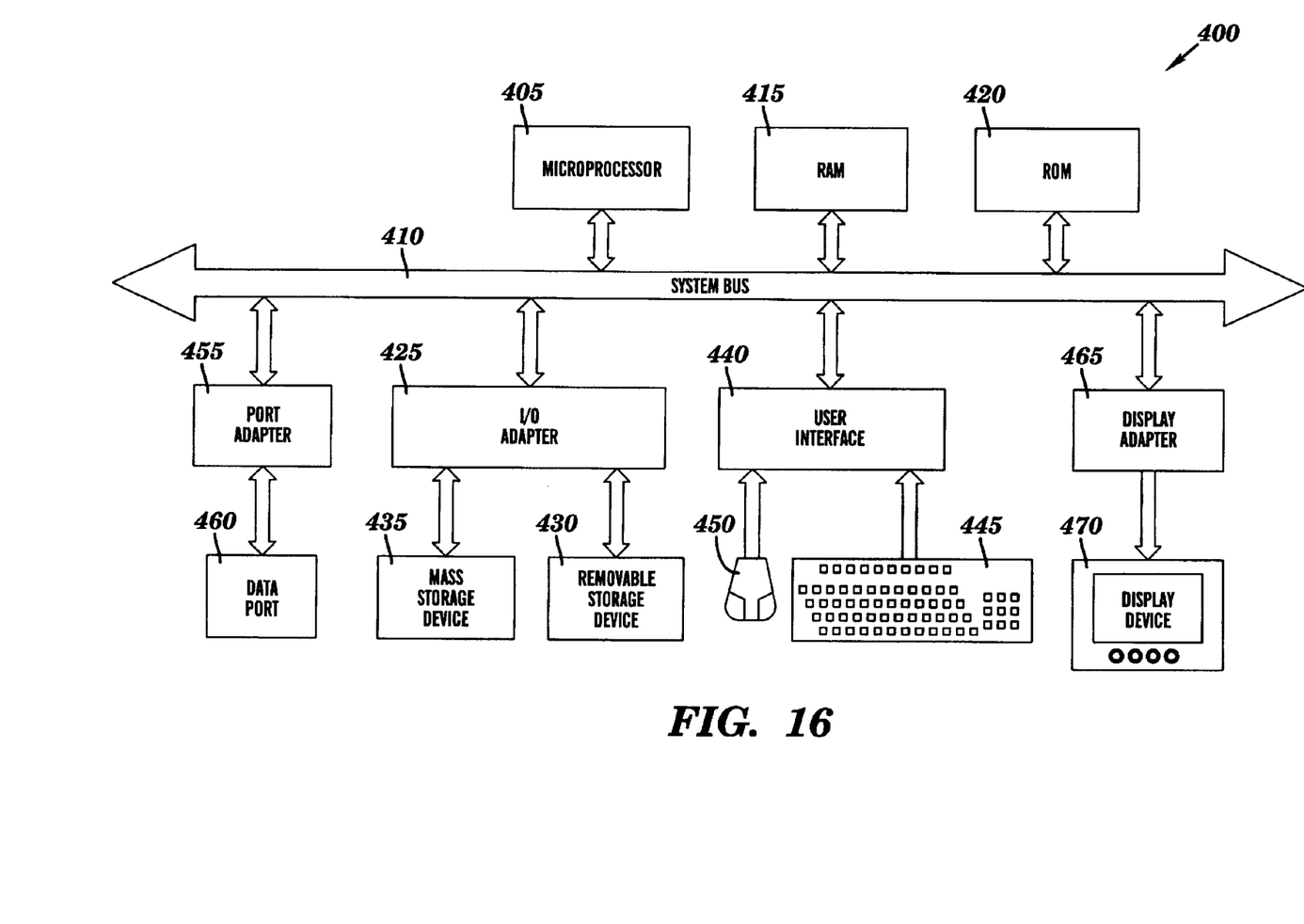
FIG. 16 is a schematic block diagram of a general-purpose computer for practicing the present invention.

Generally, the method described herein with respect to designing a voltage partitioned solder-bump package is practiced with a general-purpose computer and the method may be coded as a set of instructions on removable or hard media for use by the general-purpose computer. FIG. 16 is a schematic block diagram of a general-purpose computer for practicing the present invention. In FIG. 16, computer system 400 has at least one microprocessor or central processing unit (CPU) 405. CPU 405 is interconnected via a system bus 410 to a random access memory (RAM) 415, a read-only memory (ROM) 420, an input/output (I/O) adapter 425 for connecting a removable data and/or program storage device 430 and a mass data and/or program storage device 435, a user interface adapter 440 for connecting a keyboard 445 and a mouse 450, a port adapter 455 for connecting a data port 460 and a display adapter 465 for connecting a display device 470.

ROM 420 contains the basic operating system for computer system 400. Examples of removable data and/or program storage device 430 include magnetic media such as floppy drives and tape drives and optical media such as CD ROM drives. Examples of mass data and/or program storage device 435 include hard disk drives and non-volatile memory such as flash memory. In addition to keyboard 445 and mouse 450, other user input devices such as trackballs, writing tablets, pressure pads, microphones, light pens and position-sensing screen displays may be connected to user interface 440. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 430, fed through data port 460 or typed in using keyboard 445.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A method of designing voltage partitions in a solder bump package for a chip, comprising: determining the current requirements of a chip voltage island, said chip voltage island including chip power and signal pads, and creating an equivalent circuit model of said chip voltage island; defining a package voltage island, said package voltage island including power and signal package pins, and creating an equivalent circuit model of said package voltage island; analyzing electrical attributes of a combination of said chip voltage island model and said package voltage island model;

and modifying said package voltage island until said electrical attributes are acceptable.

2. The method of claim 1, further including defining said chip voltage island based on circuit requirements.

3. The method of claim 1, further including determining the current requirements of a chip voltage island comprising a voltage island and power and signal chip pads.

4. The method of claim 3, wherein the initial number of package voltage island power and signal pins is based on the number of chip voltage island signal pads and power and current requirements of said chip voltage island.

5. The method of claim 3, wherein said current requirements of said chip voltage island include one or more current requirements selected from the group consisting of average current, peak current and current slew rate.

6. The method of claim 1, wherein said electrical attributes include one or more attributes selected from the group consisting of noise, power supply impedance, power supply resonance, signal integrity and signal jitter.

7. The method of claim 1, wherein at least a portion of said package voltage island extends under said chip voltage island.

8. The method of claim 1, wherein said chip voltage island pads are contiguous.

9. The method of claim 1, wherein said package voltage island pins are contiguous.

10. The method of claim 1, wherein the step of modifying said package voltage island is selected from the group consisting of assigning additional power pins to said voltage island, increasing the area of said package voltage island, reassigning chip voltage island VDD, VDDX and GND power pads.

11. The method of claim 1 wherein the steps of analyzing electrical attributes of a combination of said chip voltage island model and said package voltage island model and modifying said package voltage island are repeated until acceptable electrical attributes are obtained.

12. The method of claim 1, wherein said equivalent circuit model of said package voltage island is an inductance model created using an electromagnetic field solver.

13. A computer system comprising a processor, an address/data bus coupled to said processor, and a computer-readable memory unit coupled to communicate with said processor, said memory unit containing instructions that when executed implement a method for designing voltage partitions in a package for a chip, said method comprising the computer implemented steps of: determining the current requirements of a chip voltage island, said chip voltage island including chip power and signal pads, and creating an equivalent circuit model of said chip voltage island; defining a package voltage island, said package voltage island including power and signal package pins, and creating an equivalent circuit model of said package voltage island; analyzing electrical attributes of a combination of said chip voltage island model and said package voltage island model; and modifying said package voltage island until said electrical attributes are acceptable.

14. The computer system of claim 13, further including the computer implemented step of defining said chip voltage island based on circuit requirements.

15. The computer system of claim 13, further including the computer implemented step of determining the current requirements of a chip voltage island comprising a voltage island and power and signal chip pads.

16. The computer system of claim 15, wherein the initial number of package voltage island power and signal pins is based on the number of chip voltage island signal pads and power and current requirements of said chip voltage island.

17. The computer system of claim 15, wherein said current requirements of said chip voltage island includes one or more current requirements selected from the group consisting of average current, peak current and current slew rate.

18. The computer system of claim 13, wherein said electrical attributes include one or more attributes selected from the group consisting of noise, power supply impedance, power supply resonance, signal integrity and signal jitter.

19. The computer system of claim 13, wherein at least a portion of said package voltage island extends under said chip voltage island.

20. The computer system of claim 13, wherein said chip voltage island pads are contiguous.

21. The computer system of claim 13, wherein said package voltage island pins are contiguous.

22. The computer system of claim 13, wherein the computer implemented step of modifying said package voltage island is selected from the group consisting of assigning additional power pins to said package voltage island, increasing the area of said package voltage island, reassigning chip voltage island VDD, VDDX and GND power pads.

23. The computer system of claim 13, wherein the computer implemented steps of analyzing electrical attributes of a combination of said chip voltage island model and said package voltage island model and modifying said package voltage island are repeated until acceptable electrical attributes are obtained.

24. The computer system of claim 13, wherein said equivalent circuit model of said package voltage island is an inductance model created using an electromagnetic field solver.

25. A program storage device readable by machine, tangibly embodying a program of instructions executable by the machine to perform method steps for designing voltage partitions in a package for a chip said method steps comprising: determining the current requirements of a chip voltage island, said chip voltage island including chip power and signal pads, and creating an equivalent circuit model of said chip voltage island; defining a package voltage island, said package voltage island including power and signal package pins, and creating an equivalent circuit model of said package voltage island; analyzing electrical attributes of a combination of said chip voltage island model and said package voltage island model; and modifying said package voltage island until said electrical attributes are acceptable.

26. The program storage device of claim 25, further including the machine implemented step of defining said chip voltage island based on circuit requirements.

27. The program storage device of claim 26, further including the machine implemented step of determining the current requirements of a chip voltage island comprising a voltage island and power and signal chip pads.

28. The program storage device of claim 26, wherein said current requirements of said chip voltage island include one or more current requirements selected from the group consisting of average current, peak current and current slew rate.

29. The program storage device of claim 25, wherein the initial number of package voltage island power and signal pins is based on the number of chip voltage island signal pads and power and current requirements of said chip voltage island.

30. The program storage device of claim 25, wherein said electrical attributes include one or more attributes selected from the group consisting of noise, power supply impedance, power supply resonance, signal integrity and signal jitter.

31. The program storage device of claim 25, wherein at least a portion of said package voltage island extends under said chip voltage island.

32. The program storage device of claim 25, wherein said chip voltage island pads are contiguous.

33. The program storage device of claim 25, wherein said package voltage island pins are contiguous.

34. The program storage device of claim 25, wherein the machine implemented step of modifying said package voltage island is selected from the group consisting of assigning additional power pins to said package voltage island, increasing the area of said package voltage island, reassigning chip voltage island VDD, VDDX and GND power pads.

35. The program storage device of claim 25, wherein the machine implemented steps of analyzing electrical attributes of a combination of said chip voltage island model and said package voltage island model and modifying said package voltage are repeated until acceptable electrical attributes are obtained.

36. The program storage device of claim 25, wherein said equivalent circuit model of said package voltage island is an inductance model created using an electromagnetic field solver.

* * * * *